(12) United States Patent
Chiang

(10) Patent No.: US 6,188,982 B1
(45) Date of Patent: Feb. 13, 2001

(54) ON-LINE BACKGROUND NOISE ADAPTATION OF PARALLEL MODEL COMBINATION HMM WITH DISCRIMINATIVE LEARNING USING WEIGHTED HMM FOR NOISY SPEECH RECOGNITION

(75) Inventor: Tung-Hui Chiang, Taichung (TW)

(73) Assignee: Industrial Technology Research Institute, Taiwan (CN)

( * ) Notice: Under 35 U.S.C. 154(b), the term of this patent shall be extended for 0 days.

(21) Appl. No.: 08/982,136

(22) Filed: Dec. 1, 1997

(51) Int. Cl.[7] ............................. G10L 15/20; G10L 15/14
(52) U.S. Cl. ............................................. 704/256; 704/233
(58) Field of Search ........................................ 704/233, 256

(56) References Cited

U.S. PATENT DOCUMENTS

| 4,933,973 | * | 6/1990 | Porter | 704/233 |
| 5,721,808 | * | 2/1998 | Minami et al. | 704/233 |
| 6,026,359 | * | 2/2000 | Yamaguchi et al. | 704/256 |

OTHER PUBLICATIONS

Tetsuo Kosaka, Hiroki Yamamoto, Masayuki Yamada, and Yasuhiro Komori, "Instantaneous Environment Adaptation Techniques Based on Fast PMC and MAP–CMS Methods", Proc. IEEE ICASSP 1998, vol. 2, p. 789–792, May 1998.*

Hans–Gunter Hirsch, "Adaptation of HMMs in the Presence of Additive and Convolutional Noise," Proc. 1997 IEEE Workshop on Automatic Speech Recognition and Understanding, p. 412–419, Dec. 1997.*

Keh–Yih Su and Chin–Hui Lee, "Robustness and discrimination oriented speech recognition using weighted HMM and subspace projection approaches," Proc. IEEE ICASSP 91, p. 541–544, Apr. 1991.*

(List continued on next page.)

Primary Examiner—Tãlivaldis I. Šmits
(74) Attorney, Agent, or Firm—Proskauer Rose LLP

(57) ABSTRACT

A system for adaptively generating a composite noisy speech model to process speech in, e.g., a nonstationary environment comprises a speech recognizer, a re-estimation circuit, a combiner circuit, a classifier circuit, and a discrimination circuit. In particular, the speech recognizer generates frames of current input utterances based on received speech data and determines which of the generated frames are aligned with noisy states to produce a current noise model. The re-estimation circuit re-estimates the produced current noise model by interpolating the number of frames in the current noise model with parameters from a previous noise model. The combiner circuit combines the parameters of the current noise model with model parameters of a corresponding current clean speech model to generate model parameters of a composite noisy speech model. The classifier circuit determines a discrimination function by generating a weighted PMC HMM model. The discrimination learning circuit determines a distance function by measuring the degree of mis-recognition based on the discrimination function, determines a loss function based on the distance function, which is approximately equal to the distance function, determines a risk function representing the mean value of the loss function, and generates a current discriminative noise model based in part on the risk function, such that the input utterances correspond more accurately with the predetermined model parameters of the composite noisy speech model.

20 Claims, 2 Drawing Sheets

OTHER PUBLICATIONS

Keh–Yih Su and Chin–Hui Lee, "Speech Recognition Using Weighted HMM and Subspace Projection Approaches," IEEE Trans. Speech and Audio Processing, vol. 2, No. 1, p. 69–79, Jan. 1994.*

Harry L. Van Trees, Detection, Estimation, and Modulation Theory, Part 1, p. 143, 1998.*

M. J. F. Gales and S. J. Young, "A Fast and Flexible Implementation of Parallel Model Combination," Proc. IEEE ICASSP 95, p. 133–136, May 1995.*

M. J. F. Gales and S. J. Young, "Robust Continuous Speech Recognition Using Parallel Model Combination," IEEE Trans. Speech and Audio Processing, vol. 4, No. 5, p. 352–359, Sep. 1996.*

* cited by examiner

ON-LINE BACKGROUND NOISE ADAPTATION OF PARALLEL MODEL COMBINATION HMM WITH DISCRIMINATIVE LEARNING USING WEIGHTED HMM FOR NOISY SPEECH RECOGNITION

FIELD OF THE INVENTION

The present invention relates to a speech recognition method, and, more particularly, relates to a two stage Hidden Markov Model (HMM adaption method utilizing an "on-line" Parallel Model Combination (PMC) and a discriminative learning process to achieve accurate and robust results in real world applications without having to collect environment background noise in advance.

BACKGROUND OF THE INVENTION

Many electronic devices need to determine a "most likely" path of a received signal. For example, in speech, text, or handwriting recognition devices, a recognized unit (i.e., sound, syllable, letter, or word) of a received signal is determined by identifying the greatest probability that a particular sequence of states was received. This determination may be made by viewing the received signal as generated by a hidden Markov model (HMM). A discussion of Markov models and hidden Markov models is found in Rabiner, "A Tutorial on Hidden Markov Models and Selected Applications in Speech Recognition", Proceedings of the IEEE, Vol. 77, No. 2, February 1989. Also, this signal may be viewed as generated by a Markov model observed through a "noisy" process. This is discussed in Forney, "The Viterbi Algorithm", Proceedings of the IEEE, Vol. 61, No. 3, March 1973. The contents of these articles are incorporated herein by reference.

Briefly, a Markov model is a system which may be described as being in any one of a set of N distinct states (while in a hidden Markov model the states are unknown). At regularly spaced time intervals, the system makes a transition between states (or remains in the same state) according to a set of transition probabilities. A simple three state Markov model is illustrated in FIG. 1.

FIG. 1 shows a three state transition model 15. In this model, it is assumed that any state may follow any other state, including the same state repeated. For each state, there is a known probability indicating the likelihood that it will be followed by any other state. For example, in the English language, this probability may be statistically determined by determining how often each letter is followed by another letter (or itself). In this illustration, assume that state 1 [indicated as $S_1$] is the letter A, state 2 [indicated as $S_2$] is the letter B, and state 3 [indicated as $S_3$] is the letter C. Probabilities are assigned to the likelihood that any one of these letters will follow the same or another letter. In this example, an illustrative probability of 0.1 has been assigned to the likelihood that A will be followed by another A, 0.4 that A will be followed by a B, and 0.5 that A will be followed by a C. The same is done for the letters B and C, resulting in a total of nine probabilities. In this model, the state is apparent from the observation, that is, the state is either A, B, or C in the English language.

Often the states of the model generating the observations cannot be observed, but may only be ascertained by determining the probabilities that the observed states were generated by a particular model. For example, in the example of FIG. 1, assume that due to "noise", there is a known probability that in state A the symbol may be corrupted to appear to be a B, and a known probability that in state A the symbol will be corrupted to appear as a C. The same is true for B and C. To determine the best state sequence associated with the observations of this "noisy" state sequence, the text recognition device must determine, through probabilities, which letters are most likely to be in the sequence.

With respect to speech recognition, current technologies have produced fairly good results in recognizing speech in an ideal noiseless environment. However, when speech recognition is conducted in real-life environments, the results have been far less desirable. One of the main causes of this phenomenon is the interference of background noise in the environment. Since background noise may be considered additive in nature, one can either filter the noise from the signal source or compensate a recognition model by transferring the model parameters obtained through clean speech training data to the speech model having noise interference (as will be described below with reference to the conventional parallel model combination (PMC) approach). In other words, an approach is necessary that separates actual speech from background noise.

The current speech signal processing methods can be generally divided into three categories: 1) seeking robust features, known as discriminative measurement similarity, 2) speech enhancement, and 3) model compensation.

The first category, seeking robust features, compares the background noises with a known databank of noises so that the detected noises may be canceled out. However, this method is quite impractical since it is impossible to predict every noise, as noises can vary in different environment situations. Further, the similarity of different noises and noises having particular signal-to-noise ratios (SNR) also make this method inadequate.

The second category, speech enhancement, basically preprocesses the input speech signals, prior to the pattern matching stage, so as to increase the SNR. However, an enhanced signal noise ratio does not necessarily increase the recognition rate, since the enhanced signals can still be distorted to some degree. For this reason, the methods of the speech enhancement category usually cannot deliver acceptable results.

The third category, model compensation, deals with recognition models. In particular, it compensates recognition models to adapt to the noisy environment. The most direct approach of this category is to separately collect the speech signals with the interference noise in the application environment and then train the recognition models. It is, however, difficult to accurately collect these kinds of training materials, thereby rendering this approach impractical. However, a recent model compensation method, parallel model combination (PMC), developed by Gales and Young, avoids the necessity to collect the training material in advance and is therefore very popular.

PMC assumes that speech to be recognized is modeled by a set of continuous density hidden Markov models (CDHMM) which have been trained using clean speech data. Similarly, the background noise can also be modeled using a single state CDHMM. Accordingly, speech that is interfered by additive noises can be composed of a clean speech model and a noise model. The parallel model combination is shown in FIG. 2.

In brief, the symbols of $\mu^c$ and $\Sigma^c$, discussed below, represent the mean vector and the covariance matrix, respectively, of any state output distribution in a cepstral domain. Cepstral parameter are derived from the log spectrum via a discrete cosine transform and is represented by a matrix C. Since the discrete cosine transform is linear, the corresponding mean vector and the covariance matrix in the cepstral domain (represented by $\mu^l$ and $\Sigma^l$ respectively) can be presented with the following equations:

$$\mu^l = C^{-1}\mu^c$$
$$\Sigma^l = C^{-1}\Sigma^c(C^{-1})^T \qquad (1)$$

If Gaussian distribution is assumed in both the cepstral and log spectral domains, then the mean vector and covariance matrix of the $i^{th}$ component in the linear domain can be expressed as:

$$\mu_i = \exp(\mu_i^l + \Sigma_{ji}^l/2)$$
$$\Sigma_{ij} = \mu_i\mu_j[\exp(\Sigma_{ij}^l) - 1] \qquad (2)$$

If the speech signal and the noise signal are assumed to be independent of each other and are additive in a linear domain, then the combined mean vector and the covariance matrix can be expressed as:

$$\bar{\mu} = g\mu + \tilde{\mu}$$
$$\bar{\Sigma} = g^2\Sigma + \tilde{\Sigma} \qquad (3)$$

where $(\mu, \Sigma)$ are the speech model parameters and $(\tilde{\mu}, \tilde{\Sigma})$ are the noise model parameters. The factor of g is a gain matching term introduced to account for the fact that the level of the original clean speech training data may be different from that of the noisy speech.

The above mean vector and covariance matrix may be expressed in the log spectral domain as:

$$\bar{\mu}_i^l = \log(\bar{\mu}_i) - \frac{1}{2}\log\left(\frac{\bar{\Sigma}_{ij}}{\bar{\mu}_i^2} + 1\right) \qquad (4)$$
$$\bar{\Sigma}_{ij}^l = \log\left[\frac{\bar{\Sigma}_{ij}}{\bar{\mu}_i\bar{\mu}_j} + 1\right]$$

Further, when it is transformed back into the cepstral domain, the values of the mean vector and the covariance matrix can be expressed as:

$$\bar{\mu}^c = C\bar{\mu}^l$$
$$\bar{\Sigma}^c = C\bar{\Sigma}^l(C)^T \qquad (5)$$

Although the PMC method has been proven to be effective against additive noises (there is no need to collect noise interference signals in advance), it does require that the background noise signals be collected in advance to train the noise model. This noise model is then combined with the original recognition model, trained by the clean speech, to become the model that can recognize the environment background noise. As is evident in actual applications, noise changes with time so that the conventional PMC method cannot be used to process speech in a nonstationary environment. This is true since there can be a significant difference between the background noise previously collected and the background noise in the actual environment. For this reason, the conventional PMC is inadequate for processing noises in a nonstationary state.

It is therefore an object of the present invention to overcome the disadvantages of the prior art.

SUMMARY OF THE INVENTION

To overcome the above-mentioned limitations of the PMC method, the present invention discloses a two-stage hidden Markov model adaptation method.

The first stage comprises an on-line parallel model combination. The advantages of this on-line PMC method over the conventional PMC method lies mainly in its avoidance of the need to collect the background noise in advance. Instead, the background noise is filtered from the input noisy speech and is linearly combined with corresponding clean speech HMMs to form a robust composite HMM.

In addition, a discriminative learning method is incorporated in the second stage to increase the recognition rate of the system.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which.

DETAILED DESCRIPTION OF THE INVENTION

Figure 3:
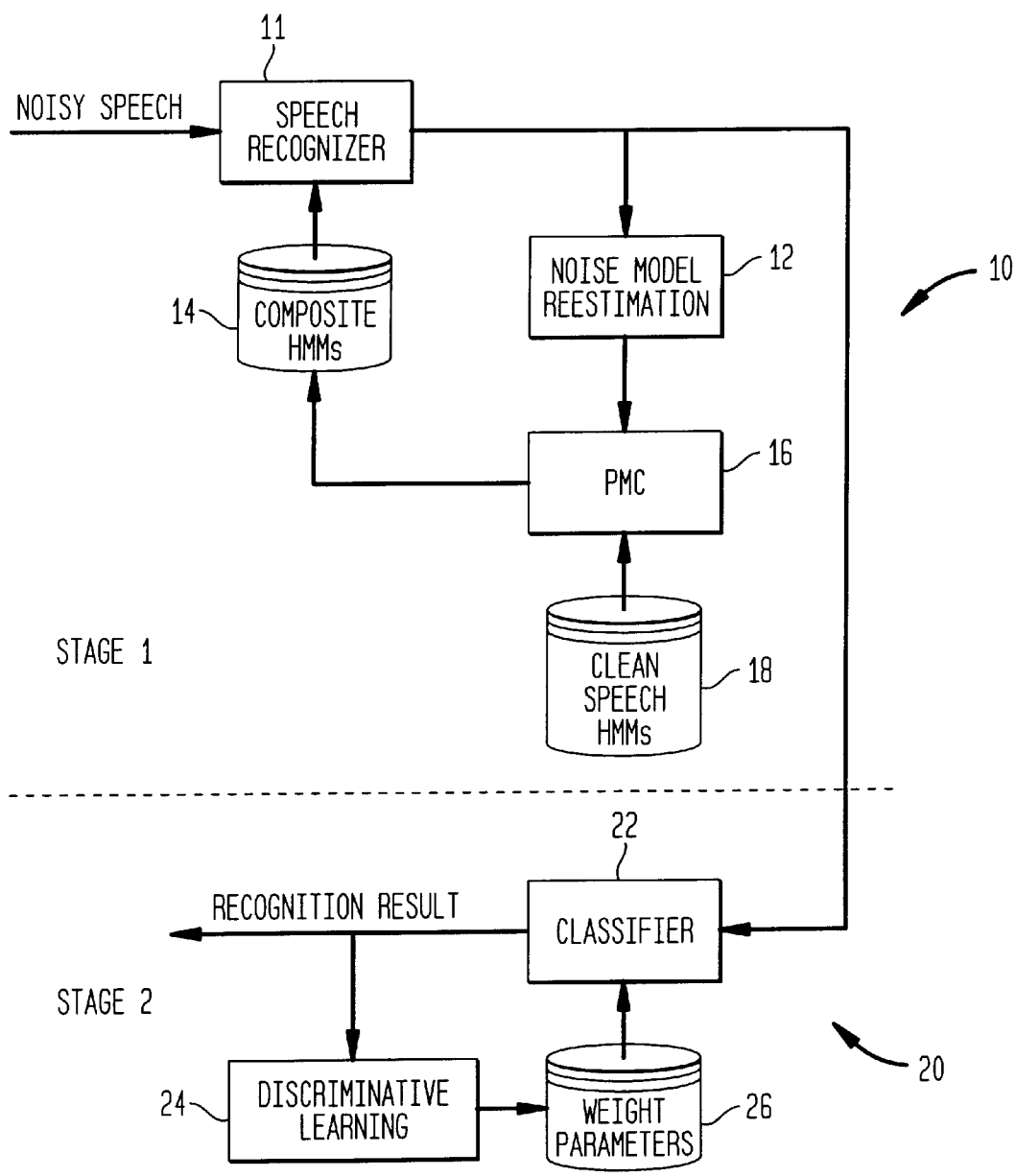
FIG. 3 shows a two stage Hidden Markov Model (HMM) adaption method in accordance with the present invention.

FIG. 3 schematically illustrates the two stage Hidden Markov Model (HMM) adaption method having a first stage "on-line" PCM 10 and a second stage discriminative learning process 20 in accordance with the present invention. Although the second stage 20 further improves the accuracy of the overall process (by resulting in a model closer to the model space of the testing data), the present invention is also applicable using only the first stage while still achieving stellar results.

The first stage on-line PCM 10 comprises a speech recognizer 11, a noise model re-estimation circuit 12, a clean speech HMM circuit 18, a PMC circuit 16, and a composite HMM circuit 14. "Noisy speech" data is sent to speech recognizer 11 which uses a Viterbi decoding scheme to determine frames of input utterances. In other words, the input utterances are recognized in speech recognizer 11 based on the testing data itself. Recognizer 11 further determines which frames of the recognized input utterances are aligned with noise states. The aligned sequence of frames are then extracted (as the current noise model) and sent to a noise model re-estimation circuit 12.

The current noise model is re-estimated using an interpolation method, such as recursive ML (maximum likelihood) estimation. First, it can be assumed that a previous noise model was obtained through estimating n noise frames. Thus, let $\lambda(n)$ stand for the parameters estimated from the noise portions of the previous utterances. Next, let us further assume that the current noise model contains κ number noise frames, which can be represented by $\lambda(\kappa)$. Thus, the re-estimated noise model, denoted by $\lambda(n+\kappa)$, can be represented as an interpolation of $\lambda(n)$ and $\lambda(\kappa)$ using the following equation:

$$\lambda(n+k) = \frac{n}{n+k}\lambda(n) + \frac{k}{n+k}\lambda(k) \qquad (6)$$

However, note that there need not be a previous noise model, i.e., n may be zero, such that the re-estimated noise model, $\Lambda(n+\kappa)$, may be determined based solely by κ in the current noise model.

Figure 1:
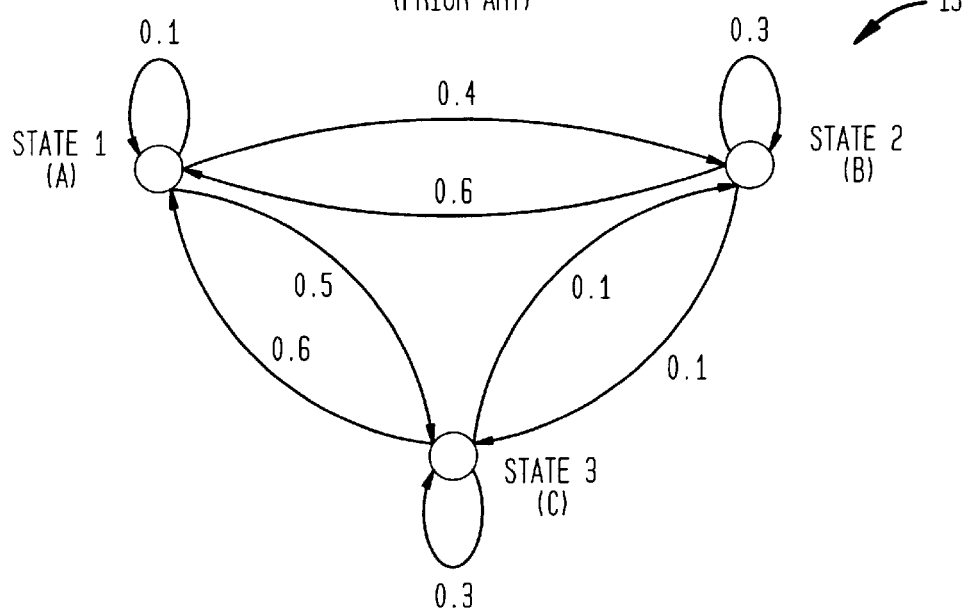
FIG. 1 illustrates a three state Markov model.
Figure 2:
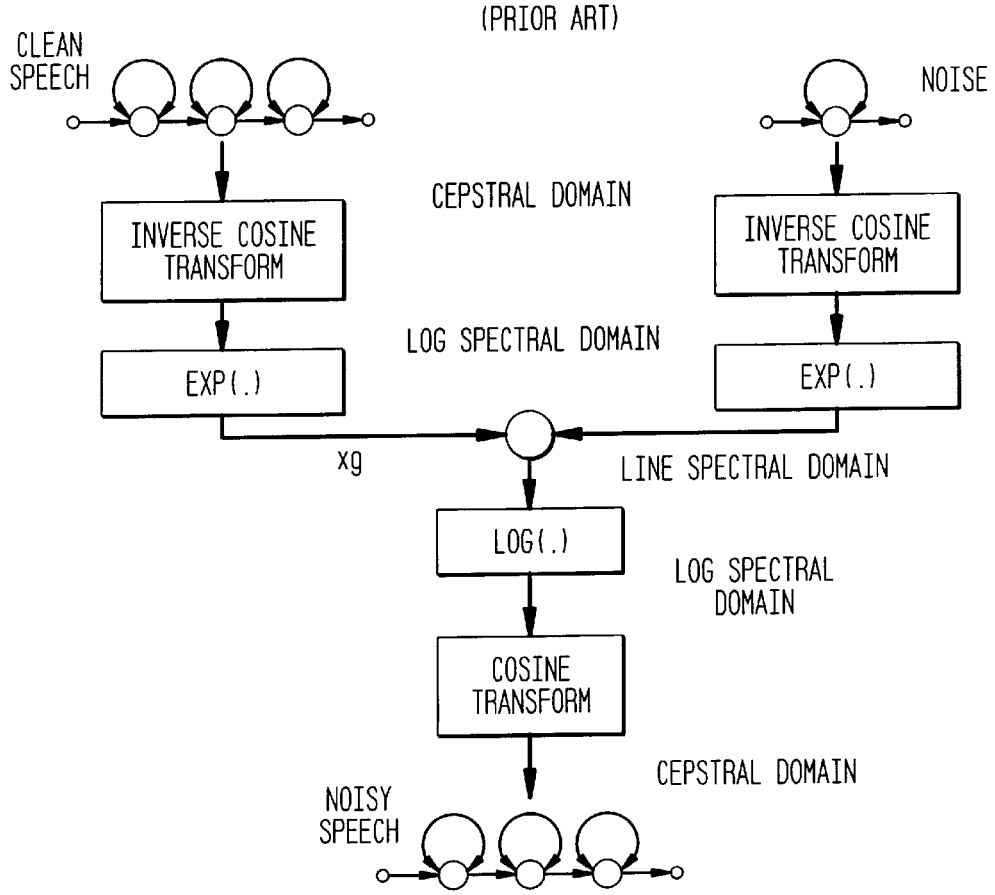
FIG. 2 shows a conventional parallel model combination (PMC) process.

The re-estimated current noise model parameters in a noise model re-estimation circuit 12 is then stored back to noise model re-estimation circuit 12. The re-estimated current noise model parameters in the noise model re-estimation circuit 12 are then linearly combined with the corresponding current clean speech model parameters (determined in the clean speech HMMs circuit 18) in the PMC circuit 16. Such combination noted combined current speech model parameters occurs in the linear spectral domain, as described with reference to FIG. 2.

The combined current speech model parameters, which will be named the previous speech model parameters are stored in the composite HMMs circuit 14 to be subsequently recognized by speech recognizer 11.

The second stage learning discrimination 20 comprises a classifier circuit 22, a discrimination learning circuit 24 and a weight HMM circuit 26. Basically, the learning discrimination process takes into account robustness issues by minimizing the error rate of the test data.

To minimize the error rate, classifier 22 defines a discrimination function in terms of a weighted HMM. The discrimination function, with respect to the j-th class, denoted by $g_j$, is given by the following equation:

$$g_j(O, S_j; \Lambda) = \sum_{i=1}^{K} (w_{j,i} \cdot SC_{j,i}) \quad (7)$$

where $O = o_1, o_2, \ldots, o_T$ is the input feature vector of T number of frames, K is total amount of states, $SC_{j,i}$ represents the corresponding accumulated log probabilities of state i in class j, $\Lambda = \{w_{j,i}\}_{\forall j,i}$, and $w_{j,i}$ represents the corresponding weighted state i in class j.

Based on the discrimination function g, a distance function, d, measuring the degree of mis-recognition between two competing class candidates $\alpha$ and $\beta$ is defined as follows:

$$d_{\alpha\beta}(O) = g(O, S_\alpha; \Lambda) - g(O, S_\beta; \Lambda), \quad (8)$$

where $\alpha$ represents the top candidate and $\beta$ represents the next-to-top candidate.

It can be noted from this equation that a recognition error occurs (namely, when $\alpha$ for $\beta$ are switched), when $d_{\alpha\beta} < 0$. For each recognition error, a loss function can be defined as follows:

$$l(d_{\alpha\beta}(O)) = \begin{cases} \tan^{-1}\left(\dfrac{d_{\alpha\beta}}{d_o}\right), & d_{\alpha\beta} < 0, \\ 0, & \text{otherwise,} \end{cases} \quad (9)$$

The loss function can have the value of $d_0$ (be a relatively small positive value).

After the loss function is defined, a risk function, R, can be defined. The risk function determines the mean value of the loss function for N numbers of training speech data:

$$\overline{R}(O; \Lambda) = \frac{1}{N} \sum_{k=1}^{N} l(d(O^k)), \quad (10)$$

where $O = O^1, O^2, \ldots, O^N$, and $O^k$ represents the $k^{th}$ training speech data. By taking differential derivative, the current weighted parameter (indicated as $\Lambda_{1+l}$) at the $l^{th}$ adjustment, can be obtained using the following adaption equation:

$$\begin{cases} \Lambda_{l+1} = \Lambda_l + \Delta\Lambda_l, & \text{if } d(O) < \tau \\ \Delta\Lambda_l = -\varepsilon(l) U \nabla \overline{R}_{\Lambda_l}(O; \Lambda_l), \end{cases} \quad (11)$$

where $\tau(\tau > 0)$ is a preset margin, $\epsilon(1)$ is the learning constant that is a decreasing function of 1, and U is a positive-definite matrix, such as an Identity matrix. The weigh HMM circuit 26 could store the current weighted parameters adjusted by the discriminative learning circuit 24. Thereafter, the current weighted parameters would be changed to previous weighted parameters.

Accordingly, a two stage Hidden Markov Model (HMM) adaption method having a first stage "on-line" PCM 10 and a second stage discriminative learning process 20 has been described. The advantages of the first stage over convention PMC processes include the fact that no pre-collection of noise is required and that testing utterances themselves are used for model composition, such that the inventive composite models are more robust against changes in environment noise. The advantages of the second stage are that it reduces the error rate to enhance the overall discrimination capability.

Finally, the above-discussion is intended to be merely illustrative of the invention. Numerous alternative embodiments may be devised by those having ordinary skill in the art without departing from the spirit and scope of the following claims.

The claimed invention is:

1. A method of generating a composite noisy speech model, comprising the steps of:

generating frames of current input utterances based on received speech data, determining which of said generated frames are aligned with noisy states to produce a current noise model, re-estimating the produced current noise model by interpolating the number of frames in said current noise model with parameters from a previous noise model, combining the parameters of said current noise model with templates of a corresponding current clean speech model to generate templates of a composite noisy speech model, determining a discrimination function by generating a weighted current noise model based on said composite noisy speech model, determining a distance function by measuring the degree of mis-recognition based on said discrimination function, determining a loss function based on said distance function, said loss function being approximately equal to said distance function, determining a risk function representing the mean value of said loss function, and generating a current discriminative noise model based in part on said risk function, such that the input utterances correspond more accurately with the predetermined templates of the composite noisy speech model.

2. The method of claim 1, wherein said step of re-estimating being based on the equation:

$$\lambda(n+k) = \frac{n}{n+k}\lambda(n) + \frac{k}{n+k}\lambda(k),$$

where $\lambda(n)$ represents said parameters of said previous noise model, $\lambda(k)$ represents the parameters of frames of said current noise model, and λ(n+κ) represents said re-estimated current noise model.

3. The method of claim 2, wherein said generated frames aligned with noisy states are determined by a Viterbi decoding scheme.

4. The method of claim 3, wherein said combining the parameters of the re-estimated current noise model with parameters of a corresponding current clean speech model to generate a composite noisy speech model is done by using a method of parallel model combination.

5. The method of claim 4, wherein said discrimination function being:

$$g_j(O, S_j; \Lambda) = \sum_{i=1}^{K} (w_{j,i} \cdot SC_{j,i})$$

where $O = o_1, o_2 \ldots, o_T$ represents an input feature vector of T number of frames, K is the total number of states, $SC_{j,i}$ represents the corresponding accumulated log probability of state i in class j, and $W_{j,i}$ represents the corresponding weight of state i in class j.

6. The method of claim 1, wherein the current parameter is generated by the steps of:

determining a distance function by measuring the degree of mis-recognition based on the discrimination function, determining a loss function based on the distance function, determining a risk function for representing the mean value of the lose function, and generating the current weighted parameters based in part on the risk function.

7. The method of claim 6, wherein said distance function being:

$$d_{\alpha\beta}(O) = g(O, S_\alpha; \Lambda) - g(O, S_\beta; \Lambda),$$

where $W_\alpha$ represents a top weighted candidate and $W_\beta$ represents a next-to-top weighted candidate.

8. The method of claim 6, wherein said loss function being:

$$l(d_{\alpha\beta}(O)) = \tan - 1 \frac{d_{\alpha\beta}}{d_o}, d_{\alpha\beta} < 0; 0, \text{otherwise}$$

where $d_0$ is a positive function.

9. The method of claim 6, wherein said risk function being:

$$\overline{R}(O; \Lambda) = \frac{1}{N} \sum_{k=1}^{N} l(d(O^k)),$$

where $O = O^1, O^2, \ldots, O^N$, and $O^k$ represents a $k^{th}$ training speech data.

10. The method of claim 9, wherein said current discriminative noise model being represented by;

$$\begin{cases} \Lambda_{l+1} = \Lambda_l + \Delta\Lambda_l, \text{if } d(O) < \tau \\ \Delta\Lambda_l = -\varepsilon(l)U \nabla \overline{R}_{\Lambda_1}(O; \Lambda_l), \end{cases}$$

where $\tau(\tau>0)$ is a preset margin, $\epsilon(l)$ is a learning constant that is a decreasing function of l, and U is a positive-definitive matrix, such as an identity matrix.

11. A system for generating a composite noisy speech model, comprising:

a speech recognizer for generating frames of current input utterances based on received speech data, and for determining which of said generated frames are aligned with noisy states to produce a current noise model, a re-estimation circuit for re-estimating the produced current noise model by interpolating the number of frames in said current noise model with parameters from a previous noise model, a combiner circuit for combining the parameters of said current noise model with templates of a corresponding current clean speech model to generate templates of a composite noisy speech model, a classifier circuit for determining a discrimination function by generating a weighted current noise model based on said composite noisy speech model, and a discrimination learning circuit, for determining a distance function by measuring the degree of mis-recognition based on said discrimination function, for determining a loss function based on said distance function, said loss function being approximately equal to said distance function, for determining a risk function representing the mean value of said loss function, and for generating a current discriminative noise model based in part on said risk function, such that the input utterances correspond more accurately with the pre-determined templates of the composite noisy speech model.

12. The system of claim 11, wherein said step of re-estimating being based on the equation:

$$\lambda(n+k) = \frac{n}{n+k}\lambda(n) + \frac{k}{n+k}\lambda(k),$$

where λ(n) represents said parameters of said previous noise model, λ(κ) represents the parameters of frames of said current noise model, and λ(n+κ) represents said re-estimated current noise model.

13. The system of claim 12, wherein said generated frames aligned with noisy states are determined by a Viterbi decoding scheme.

14. The system of claim 13, wherein said combining the parameters of the re-estimated current noise model with parameters of a corresponding current clean speech model to generate a composite noisy speech model is done by using a method of parallel model combination.

15. The system of claim 11, wherein the current parameter is generated by the steps of:

determining a distance function by measuring the degree of mis-recognition based on the discrimination function, determining a loss function based on the distance function, determining a risk function for representing the mean value of the los function, and generating the current weighted parameters based in part on the risk function.

16. The system of claim 14, wherein said discrimination function being:

$$g_j(O, S_j; \Lambda) = \sum_{i=1}^{K} (w_{j,i} \cdot SC_{j,i})$$

where $O=o_1, o_2 \ldots, o_T$ represents an input feature vector of T number of frames, K is the total number of states, $SC_{j,i}$ represents the corresponding accumulated log probability of state i in class j, and $W_{j,i}$ represents the corresponding weight of state i in class j.

17. The system of claim 15, wherein said distance function being:

$$d_{\alpha\beta}(O)=g(O,S_\alpha;\Lambda)-g(O,S_\beta;\Lambda),$$

where $W_\alpha$ represents a top weighted candidate and $W_\beta$ represents a next-to-top weighted candidate.

18. The system of claim 15, wherein said loss function being:

$$l(d_{\alpha\beta}(O)) = \tan-1 \frac{d_{\alpha\beta}}{d_o}, d_{\alpha\beta} < 0; 0, \text{otherwise}$$

where $d_0$ is a positive function.

19. The system of claim 15, wherein said risk function being:

$$\overline{R}(O; \Lambda) = \frac{1}{N}\sum_{k=1}^{N} l(d(O^k)),$$

where $O=O^1, O^2, \ldots, O^N$, and $O^k$ represents a $k^{th}$ training speech data.

20. The system of claim 19, wherein said current discriminative noise model being represented by:

$$\begin{cases} \Lambda_{l+1} = \Lambda_l + \Delta\Lambda_l, \text{ if } d(O) < \tau \\ \Delta\Lambda_l = -\varepsilon(l)U\, \nabla\, \overline{R}_{\Lambda_1}(O; \Lambda_l), \end{cases}$$

where $\tau(\tau>0)$ is a preset margin, $\epsilon(l)$ is a learning constant that is a decreasing function of 1, and U is a positive-definite matrix, such as an identity matrix.

* * * * *

UNITED STATES PATENT AND TRADEMARK OFFICE
CERTIFICATE OF CORRECTION

PATENT NO. : 6,188,982 B1  
APPLICATION NO. : 08/982136  
DATED : February 13, 2001  
INVENTOR(S) : Tung-Hui Chiang Page 1 of 1

It is certified that error appears in the above-identified patent and that said Letters Patent is hereby corrected as shown below:

Title Page

Item (73) Assignee's residence:

"Industrial Technology Research Institute, Taiwan (CN)" should be changed to
--Industrial Technology Research Institute, Hsinchu (TW)--

Signed and Sealed this
Eighth Day of July, 2014

Michelle K. Lee
*Deputy Director of the United States Patent and Trademark Office*